United States Patent Office
2,968,673
Patented Jan. 17, 1961

2,968,673

CHLOROTOLYL ESTERS

Laurence A. Pursglove, Midland, Mich., assignor to The Dow Chemical Company, Midland, Mich., a corporation of Delaware No Drawing. Filed Nov. 10, 1958, Ser. No. 772,704

2 Claims. (Cl. 260—479)

The present invention is concerned with chlorotolyl esters and is particularly directed to α-chloro-o-tolyl esters of polychloro aliphatic carboxylic acids and to a method of preparing such compounds. The novel compounds correspond to the formula

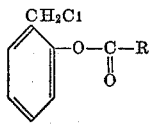

R is used in the present specification and claims to represent a polychloro lower alkyl radical containing from one to four carbon atoms, and from two to three chlorine atoms. Representative of such radicals are —CCl$_3$, —CCl$_2$CH$_3$, —CCl$_2$CH$_2$CH$_3$, —C(CH$_3$)ClCH$_2$Cl, and the like.

The present compounds are liquids or solids soluble in many common organic solvents such as chlorinated hydrocarbons, lower alkanols, and lower alkyl ketones, but of very limited solubility in water. The present compounds are useful as herbicides and parasiticides and are especially adapted to be employed to kill grass-type weeds.

The compounds of the present invention may be prepared by chlorinating an o-tolyl ester of a polychloroaliphatic acid corresponding to the formula

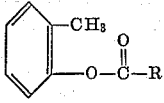

in the presence of a phosphorus chloride such as phosphorus trichloride or phosphorus pentachloride, and at a temperature in the range of 20° C. to 150° C. The reaction may be carried out in the absence of, or preferably in the presence of moderate levels of radiant energy such as ultraviolet radiation or visible light.

In such preparation the reaction takes place smoothly with the production of the desired product and hydrogen chloride of reaction when employing two atomic equivalent proportions of chlorine for each molecular proportion of ester compound. The preparation is carried out in an apparatus equipped for the disposal of such hydrogen chloride as a gas. At lower temperatures within the stated range, the desired chlorination takes place very slowly, whereas at higher temperatures within the said range, undesired byproducts are formed and purification of the desired products becomes increasingly difficult. Temperatures of above about 150° C., if employed for any appreciable period of time result in decreased yield of the α-chloro-o-tolyl ester, and increased formation of undesired byproducts. The reaction temperature range in which the desired product is prepared promptly and in good yields with minimum amounts of byproducts, which is, therefore, the preferred temperature range, is between 90° and 120° C. The reaction may be carried out, if desired, in an inert liquid reaction medium which may be a reaction solvent, such as tetrachloroethylene, carbon tetrachloride, chlorinated benzenes, and the like. Preferably, no reaction medium is employed. The phosphorus chloride catalyst is employed in a catalytic amount. Good results are obtained when a total of at least two atomic proportions of chlorine is employed for each molecular proportion of o-tolyl ester reactant; not more than 2.5 atomic proportions of chlorine should be employed if it is desired to prepare the α-monochloro compound of the present invention. Preferably about 2.2 atomic proportions of chlorine are employed. Visible or ultraviolet irradiation, if employed during the addition of chlorine, aids chlorination of the methyl group and reduces the tendency towards undesired ring chlorination. The strength of such radiation is not critical; daylight, sunlight, the intersected proportion of the output of electric lights such as incandescent or fluorescent or gas-discharge light in the range of 50 to 500 watts electric power consumption at a distance up to 20 feet have been satisfactory; although the compounds of the present invention are obtained in good yield when the reaction is carried out in the absence of light.

In carrying out the chlorination in the present method, the dry chlorine is introduced slowly, portionwise and with dispersion and stirring into a mixture of the o-tolyl ester and phosphorus halide catalyst. For this purpose, the chlorine may be introduced by a glass tube to a point under the surface of the mixture in the reaction vessel. The resulting halogenation reaction is exothermic, and may conveniently be carried out at an initial temperature well within the stated preferred temperature range. Usually, heat of reaction gradually raises the temperature of the resulting reaction mixture, and addition of chlorine may be carried out at such rate as to maintain the reaction mixture temperature within the preferred temperature range. Upon completion of the reaction, or to effect partial purification of a portion of the reaction mixture to be tested, an inert gas may be bubbled through the mixture to purge it of hydrogen chloride and unreacted chlorine.

Under the stated reaction conditions, the reaction usually takes place virtually instantaneously, to the extent chlorine is available, and the reaction may be considered to be complete when the reaction mixture, or a portion of it, after inert gas purging, has taken up a weight of chlorine equivalent to the theoretical weight. Thereafter, the desired product may be separated and purified in known procedures. In one such procedure, hydrogen chloride of reaction dissolved in the reaction mixture is purged therefrom by ventilation of the said mixture with portions of an inert gas which may be nitrogen. In the absence of a reaction medium, such purging is sufficient purification to obtain a crude α-chloro-o-tolyl ester having the utilities herein set forth. However, if desired, the crude product may be further purified; for example, it may be distilled under subatmospheric pressure.

The following example illustrates the invention but is not to be construed as limiting it.

*Example 1.—α-Chloro-o-tolyl trichloroacetate*

Dry chlorine gas was bubbled slowly through a glass tube to a point below the surface of a dispersion of 3.4 milliliters of phosphorus trichloride in 0.75 mole o-tolyl trichloroacetate which was continuously stirred, and maintained at approximately 120° C., and under strong incandescent lights. The said lights provided both irradiation and external heating. Stirring was thereafter continued and the rate of addition of chlorine as well as the rate of external heating were adjusted to maintain the reaction temperature at approximately 120° C. throughout the further time required to take up 70 grams total of chlorine. During the course of the addition of chlorine, hydrogen chloride of reaction was formed. Portions of this hydrogen chloride dissolved spontaneously in the reaction mixture, and upon saturation thereof further hydrogen chloride escaped as a gas. Upon completion of the addition of the stated amount of chlorine, the reaction mixture was allowed to cool slowly and over a period of time as the mixture was purged by bubbling nitrogen gas through it, through the tube previously employed for introduction of chlorine. By this means, a major proportion of dissolved hydrogen chloride of reaction was removed, to obtain a crude α-chloro-o-tolyl trichloroacetate product. This product was found upon analysis to contain 50.7 percent hydrolyzable chlorine in comparison with a theoretical 49.3 percent. A portion of the crude product was fractionally distilled at gradually increasing temperatures and under diminishing subatmospheric pressure to separate an α-chloro-o-tolyl trichloroacetate product as a liquid having a refractive index $n$ 20/4 of 1.5475.

In other preparations carried out in the manner of Example 1 the following products are prepared:

By chlorination of o-tolyl 2,2-dichloropropionate, an α-chloro-o-tolyl 2,2-dichloropropionate product;

By chlorination of o-tolyl 2,2-dichlorobutyrate, an α-chloro-o-tolyl 2,2-dichlorobutyrate product.

By chlorination of o-tolyl 2,3-dichloroisobutyrate, an α-chloro-o-tolyl 2,3-dichloroisobutyrate product;

By chlorination of o-tolyl 3,3,3-trichlorobutyrate, an α-chloro-o-tolyl 3,3,3-trichlorobutyrate product.

The compounds of the present invention are useful as herbicides. For such use, the unmodified compounds may be used. Alternatively, the compounds may be dispersed on an inert finely divided solid and the resulting preparation employed as a dust. Also, such preparations may be dispersed in water with or without the aid of a wetting agent and the resulting aqueous suspensions employed as sprays. In other procedures, the compounds may be employed in oil or other solvent or as a constituent of solvent-in-water or water-in-solvent emulsions or as aqueous dispersions thereof which may be applied as spray, drench, or wash. In a representative operation, the application to soil heavily infested by germinant seeds and emerging seedlings of the grass *Echinochloa frumentacea* of an aqueous dispersion of α-chloro-o-tolyl trichloroacetate at a rate corresponding to 12.5 pounds of the said acetate compound per acre of infested soil resulted in a 100 percent kill of the said grass seeds and seedlings.

The o-tolyl esters of haloaliphatic acids employed as starting materials in the practice of the present invention are prepared in known procedures. In one such procedure, an acyl chloride corresponding to the formula

is added slowly, portionwise, and with stirring to o-cresol corresponding to the formula

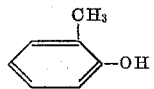

at temperatures in the range of 90° to 120° C. in the presence of a reaction medium such as a chlorobenzene, if desired. Such addition, with heating and stirring, are continued over a total time of 1 to 4 hours or longer, to carry the reaction to completion, to obtain the desired tolyl ester and hydrogen chloride of reaction. Thereafter, the reaction mixture may be distilled under reduced pressure to obtain in purified form the desired product which may then be employed as a starting material in the described procedures of the present invention.

Various modifications of the process and products of the present invention may be made without departing from the spirit or scope thereof, and it is to be understood that I limit myself only as defined in the appended claims.

I claim:
1. A compound corresponding to the formula

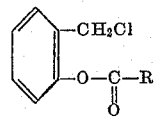

wherein R is a polychloro lower alkyl radical containing from 1 to 4 carbon atoms and from 2 to 3 chlorine atoms.
2. α-Chloro-o-tolyl trichloroacetate.

References Cited in the file of this patent
UNITED STATES PATENTS

| | | |
|---|---|---|
| 2,680,764 | Ney | June 8, 1954 |
| 2,870,193 | Pollack | Jan. 20, 1959 |

FOREIGN PATENTS

| | | |
|---|---|---|
| 773,131 | Great Britain | Apr. 24, 1957 |

OTHER REFERENCES

Ellis: Chemistry of Petroleum Derivatives, vol. I, pages 768–74 (1934).
Segusser: J.A.C.S., vol. 64, pages 825–6 (1942).
Helferich et al.: Ber., vol. 83, pages 569–70 (1950).
Goldberg et al.: J. Chem. Soc., pages 2540–1 (1954).
Hickinbottom: "Reactions of Organic Compounds," pages 60 and 61 (1948).